No. 644,527. Patented Feb. 27, 1900.
G. W. LYTEL.
REVERSING GEAR.
(Application filed Jan. 26, 1899.)
(No Model.)
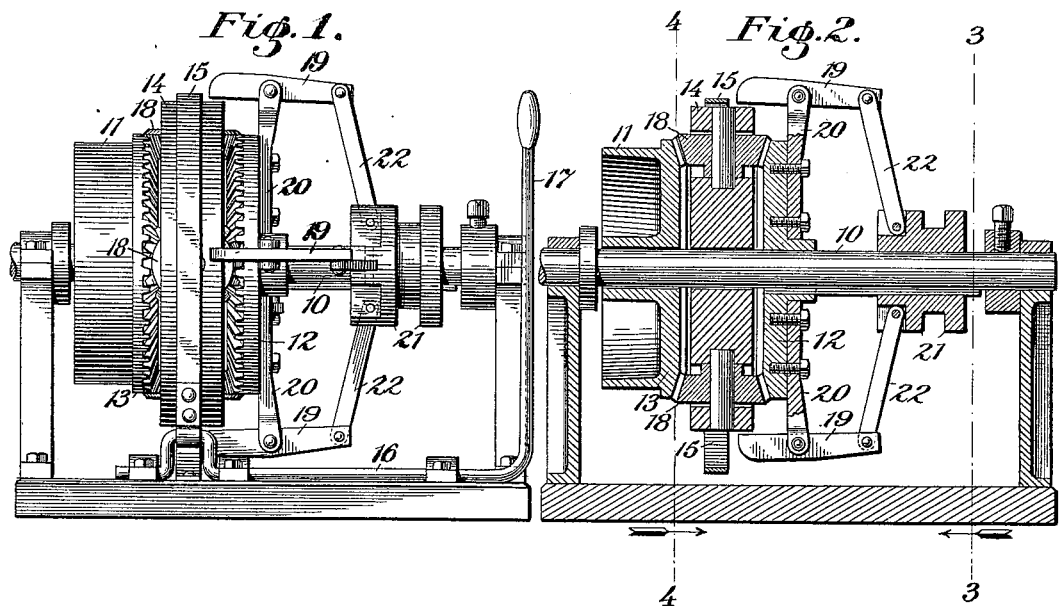
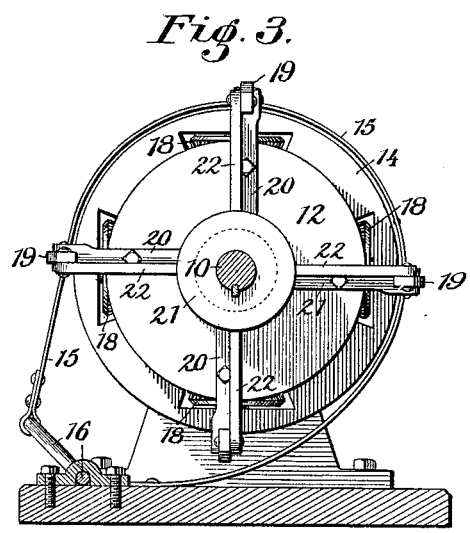
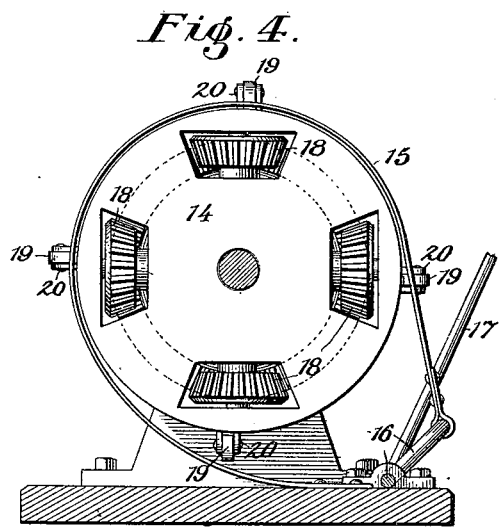
George W. Lytel, Inventor

UNITED STATES PATENT OFFICE.

GEORGE W. LYTEL, OF FINDLAY, OHIO.

REVERSING-GEAR.

SPECIFICATION forming part of Letters Patent No. 644,527, dated February 27, 1900.

Application filed January 26, 1899. Serial No. 703,494. (No model.)

*To all whom it may concern:*

Be it known that I, GEORGE W. LYTEL, a citizen of the United States, residing at Findlay, in the county of Hancock and State of Ohio, have invented a new and useful Reversing-Gear, of which the following is a specification.

My invention relates to a reversing-gear whereby rotary motion may be communicated from a member rotating continuously in a uniform direction to impart rotary motion in either direction to another or driven member; and one object in view is to provide a simple, compact, and efficient construction and arrangement of parts whereby the desired direction of rotation of the driven member may be obtained.

Further objects and advantages of this invention will appear in the following description, and the novel features thereof will be particularly pointed out in the appended claim.

In the drawings, Figure 1 is a side view of a reversing-gear constructed in accordance with my invention. Fig. 2 is a longitudinal section of the same. Fig. 3 is a transverse section on the plane indicated by the line 3 3 of Fig. 2. Fig. 4 is a transverse section on the plane indicated by the line 4 4 of Fig. 2, showing the reversing element in elevation.

Similar reference characters indicate corresponding parts in all the figures of the drawings.

In the construction illustrated in the drawings, 10 represents a shaft, and 11 a pulley loosely mounted upon the shaft, said shaft and loose pulley constituting driving and driven elements, respectively, the former in practice being attached to or formed as a continuation of an engine-shaft. (Not shown.) The gear consists, essentially, of a driving member 12, carried by the driving element, a driven member 13, carried by and, if preferred, formed integral with the driven element, and an intermediate reversing member 14, having an exterior brake-wheel rim encircled by a brake-band 15, adapted to be actuated in any suitable manner, as by a rock-shaft 16, and a brake-lever 17 to enable the operator to apply the desired restraining force to the reversing member. The driving member of the gear consists of a bevel gear-wheel, which is secured in any suitable manner to the driving element 10, and the driven member 13 is of similar construction, having gear-teeth facing those of the driving member, while the intermediate or reversing member is provided with a plurality of bevel-pinions or planetary gears 18, having spindles disposed radially with relation to the reversing member and arranged to mesh continuously at opposite sides with the gear-teeth of the members 12 and 13, the said pinions being of such diameter as to project at opposite sides beyond the adjacent surfaces of the body portion of the reversing member.

The reversing member is loosely mounted upon the driving element 10, and it is obvious that when allowed to turn freely the rotary motion of the driving member 10 will be communicated to the pinions; but any resistance to the motion of the driven member 13, as by machinery connected by a belt with the pulley 11, will neutralize the tendency of said pinions to communicate motion to the member 13, and hence will cause a forward rotation of the member 14 in the same direction as the member 10, but at a reduced speed, as one-half that of the member 10. On the other hand, by locking the reversing member to the driving element to prevent the relative movement of the driving member and the pinions 18 the driven member 13 will be carried forward with the driving element at a corresponding speed therewith. To accomplish this locking of the reversing member to the driving element; I employ clutch-levers 19, pivotally mounted at intermediate points upon radial arms 20, carried by the driving member 12, a clutch-collar 21, feathered upon the driving element 10 and adapted for movement toward and from the plane of the driving member 12, and connecting-rods 22 between the clutch-collar and corresponding extremities of the levers 19. Any suitable means may be employed for communicating motion, manually or otherwise, to the clutch-collar, and when the latter is moved toward the plane of the driving member of the reversing-gear the three ends of the levers 19 will be forced inward upon the periphery of the reversing member 14 to secure the latter for motion with the driving element. On the other hand, if it is desired to communicate reverse motion to the driven member of the gear, it is necessary to secure the reversing member against rotary motion, while allowing the driving member to rotate independently thereof, and hence I operate the brake to secure the reversing member in a fixed position and release said reversing member from the driving element by backing the clutch-collar 21, whereupon the driving member of the gear mechanism communicates rotary motion to the pinions 18, and these in turn communicate motion to the driven member 13 in a direction opposite to that of the movement of the driving member. Thus by the simple manipulation of the brake and the clutch, consisting of the levers 19, collar 21, and connecting-rods 22, I am enabled to communicate forward motion from the driving member directly to the driven member, or to allow the driven member to stop by allowing the forward motion of the driving member to be communicated to the reversing member, or to cause the driving member to communicate reverse motion to the driven member. Furthermore, it will be seen that the parts are of simple construction and are of the minimum number, the same being readily accessible to facilitate cleaning, oiling, and repairing or replacing.

Various changes in the form, proportion, and the minor details of construction may be resorted to without departing from the spirit or sacrificing any of the advantages of the invention.

Having described my invention, what I claim is—

In a clutch mechanism adapted to transmit motion from a rotatable shaft, the combination with the shaft, of a driver keyed to rotate with the shaft and having a gear-face upon one side, a driven element directly mounted loosely upon the shaft and having a gear-face adjacent the driver to coöperate with the gear-face of the latter, a disk loosely mounted directly upon the shaft, transverse openings in the disk, gears rotatably mounted in the opening and engaging the gears of the adjacent elements at points equidistant from their centers, whereby one element may be rotated from the other element in a reverse direction and at an equal speed, a brake engaging the disk and adapted to hold it against rotation, clutch-arms mounted upon the driver and adapted to engage and hold the disk, and means for operating the clutch-arms.

In testimony that I claim the foregoing as my own I have hereto affixed my signature in the presence of two witnesses.

GEORGE W. LYTEL.

Witnesses:
JNO. SHERIDAN,
MARTIN MCKENZIE.